United States Patent Office 3,171,830
Patented Mar. 2, 1965

3,171,830
CROSSLINKING PROCESS
Clifton L. Kehr, Ednor, Md., assignor to W. R. Grace & Co., a corporation of Connecticut
No Drawing. Filed June 19, 1962, Ser. No. 203,434
20 Claims. (Cl. 260—88.2)

This invention relates to a novel method of crosslinking olefin polymers. More particularly, this invention is concerned with crosslinking polyethylene and ethylene containing olefin copolymers containing carbonyl groups by a non-radical mechanism.

Summarily, this invention comprises crosslinking normally solid olefin polymers containing $-CH_2-CH_2-$ monomer units, said polymers containing 0.05 to 5.0 weight percent carbonyl by subjecting said polymers to the action of a member of the group consisting of hydrazine and polyamine compounds containing at least 2 primary amino groups wherein the nitrogen in each amino group is attached to a hydrocarbon radical.

Thus the above polyamine compounds include but are not limited to compounds such as hydrazine; ethylenediamine, 1,2-propanediamine; 1,3-propanediamine; hexamethylene diamine; diethylenetriamine, triethylenetetramine, tetraethylenepentamine, etc.; o-, m-, or p-phenylenediamine; 1,2,4-triaminobenzene, 1,3,5-triaminobenzene, etc.; 2,4-diaminotoluene, 2,4,6-triaminotoluene, etc.; 2,4-diaminoanisole; 1,2-diamino-4-nitrobenzene; 1,2-diaminocyclohexane; o-, m-, or p-xylene diamine; 4,4'-diaminodiphenylmethane; 1,8-diaminonaphthalene, 2,7-diaminonaphthalene, etc.; 2,7-diaminofluorene; 2,4-diamino-n-butyric acid; 2,6-diaminopyridine; 2,4,5,6-tetraaminopyrimidine; 2-hydroxyethyl-1,4-diaminobutane; 3,3'-dichloro-4,4'-diaminodiphenylmethane and the like.

The invention will be described in terms of carbonyl containing polyethylene for succinctness hereinafter unless otherwise specified. However when the term polyethylene is used in this invention it also includes ethylene containing olefinic copolymers.

By the term "normally solid" as used herein is meant thermoplastic or elastomeric olefin polymers.

By the term "carbonyl group" as used throughout this invention is meant a ketone or aldehyde group. The carbonyl group may comprise a part of the main chain polymer or may be present on a branch or both.

The carbonyl group is introduced by oxidation of hydrocarbon functions in polymer chains.

Polyethylene described in U.S. 2,153,553 and in U.S. 2,816,883 is well known in the art today and is generally characterized by its organic solvent solubility and thermoplastic properties. Lately, several methods have been tried with varying success to decrease the thermoplasticity and solubility by crosslinking the polymer. Such methods include electron impingement of the polymer and blending of free radical liberating substances into the polymer. In regard to the aforesaid latter method of polymer crosslinking the main compounds which have been utilized as crosslinking agents to date include organic peroxides and azo compounds. Such agents crosslink the polymer by a free radical mechanism. Although it is known that various organic peroxides will cause crosslinking upon admixture with polyolefins and other polymeric materials, many have been found lacking in certain regards. Thus for example, benzoyl peroxide at the necessary blending temperatures is a hazard due to its capability to decompose violently. Still other peroxides lack a sufficient half-life at the temperatures of incorporation into the molten polymer to permit uniform crosslinking therein. The azo compounds often have the drawback that, when used in sufficient quantity to obtain uniform crosslinking, the compound on decomposition gives off nitrogen which produces bubbles in the polymer. Thus there has been a long felt want for a non-radical method of crosslinking essentially saturated normally solid olefin polymers.

The carbonyl groups in the polyethylene react with the polyamine compounds of the instant invention to yield polymer that is crosslinked.

The advantages of the present system over crosslinking by a free radical mechanism include: (1) better control of the degree of crosslinking by controlling the number of reactive carbonyl groups and (2) the ability to crosslink in the presence of oxygen. In free radical systems, an inert atmosphere is required as oxygen has an adverse effect on crosslinking.

The process by which oxidation of the polyethylene material is performed is not critical. Polyethylene can be readily oxidized by various well-known methods to give polymers containing carbonyl groups. For example, polyethylene can be milled in air at a temperature in the range 100–200° C. Another method would include passing air into an oven over a solid polyethylene therein at a temperature of about 100–135° C. Still another method would be to suspend particles of polyethylene in water or an organic solvent and either bubble air through the suspension or pressurize the system with air at 100–200° C. Yet another method would be to pass air at a temperature in the range of 100–200° C. through a fluidized bed of polyethylene particles. A further method would include pressing the polyethylene into film form and passing hot air at a temperature of 100–200° C. thereover. In all the aforestated methods of oxidizing polyethylene, if desired, a minor amount i.e. 0.05 to 5% by weight of an organic peroxide can be blended with the polymer to increase the oxidation rate.

The operable range of percent carbonyl present in the oxidized polyethylene to afford crosslinking by this invention is from 0.05 to 5% based on the weight of the polymer. Carbonyl contents above 5 wt. percent are not essential to obtaining good rapid crosslinking by the method of this invention; in fact, at concentrations above 5%, the carbonyl groups become detrimental to the stability of the polymer, especially with regard to degradative attack in the presence of ultraviolet light.

After the polyethylene has been oxidized, the crosslinking reaction results in Polymer=N—R—N=Polymer bonds by a condensation reaction between the carbonyl groups in the oxidized polyethylene and the polyamino compounds wherein R is the organic residue of the polyamine compound including the hydrocarbon radicals to which the —N= atoms are attached. Since the polyamino compounds disclosed herein are at least bifunctional, i.e., contain at least two primary amino groups, reaction of one molecule of the polyamine compound with more than one carbonyl group will result in a crosslink.

The amount of the polyamine compound added to the system to cause crosslinking is dependent upon the carbonyl content of the oxidized polyethylene. Thus, for optimum or the greatest amount of crosslinking, at least a stoichiometric amount and up to a 100% excess thereof of the polyamine compound required to react with the carbonyl groups in the polyethylene is added. Lesser amounts i.e. as low as 5% of a stoichiometric amount of the polyamine compound required to react with the carbonyl groups in the polyethylene are operable and are added if a lesser degree of crosslinking is desired.

The following examples are set down to illustrate the invention and are not deemed to limit its scope.

Throughout the instant invention the melt indices (MI) were measured under the conditions specified in ASTMD 1238–52T under Condition E (melt index) and Condition F (high load melt index) in Table 1 therein. The densities of the polymer were measured under the conditions specified in ASTMD 1505–57T.

In the examples, unless otherwise noted, a Brabender Plastograph Model Pl–V2 equipped with a recording unit for measuring changes in torque was used for the crosslinking step. The aforesaid recording unit had a range of 0–1000 units equal to 0–1 kilogram-meter of torque. This range can be increased when necessary to 0–5000, i.e., equal to 0–5 kilogram-meters of torque by the addition of weights.

The degree of crosslinking can be measured in various ways. For example, the degree of crosslinking is related to the change in torque measured by the Plastograph recorder from the time the crosslinking agent is added to the fused polymeric material until the reaction is discontinued either prematurely or because maximum torque has been achieved. The greater the degree of crosslinking the greater the viscosity of the polymeric material which in turn requires a greater torque in order to drive the plastograph at a constant r.p.m. A further check of the degree of crosslinking is the change in melt index due to crosslinking of the polymeric material. Since melt index varies inversely with viscosity which varies directly with degree of crosslinking, a lower melt index after crosslinking evidences that crosslinking occurred. A still further indication of the amount of crosslinking is the reduction in the percent carbonyl after the addition of the crosslinking agent. Still another test of crosslinking is the amount of xylene-insoluble polymer in the cured sample, referred to as percent gel.

The extent of oxidation of the polyethylene was determined by ascertaining the carbonyl content of the polymeric material by infrared analysis using the peak at 1720 cm.$^{-1}$. A Perkin-Elmer spectrophotometer, Model 221, was used. The reported percent carbonyl is defined as $$\frac{\text{gms. C=O}}{\text{gms. polymer}} \times 100$$

The reduced viscosity, i.e. RV, was obtained by dissolving 0.1 g. of the polymer in 100 cc. decalin at 135° C. in accord with the procedure of ASTMD 1601–61.

To measure stress/strain relationships (i.e. yield stress, percent elongation at yield point, tensile stress at failure, percent elongation at failure and Young's modulus at 1% elongation), cured polymer in film form (25 mils thick) was cut to ¼″ sample strips placed in the jaws (2″ apart) of a tensile strength tester (Instron, Model TT, available from Instron Engineering Inc., Quincy, Massachusetts), and separated at a strain rate of 50% per minute at 23° C. and 50% relative humidity.

The percent gel content of the polymer in the instant invention were measured by refluxing a weighed sample (approximately 0.5 g.) of polymer in a cellulose Soxhlet thimble in xylene (containing 0.3 weight percent 2,6-ditertiary-butyl-4-methyl-phenol commercially available under the trade name "Ionol" from Shell Oil Corp.) for 24 hours. The insoluble portion of the polymer sample after drying was weighed to calculate percent gel as follows:

$$\text{percent gel} = \frac{\text{weight insoluble sample}}{\text{total weight sample}} \times 100$$

The environmental stress cracking measurements (ESC) were made in accord with the conditions specified in ASTMD 1693–60T.

The crystalline melting points were measured on a polarizing hot stage microscope at a heating rate of less than 1 degree/minute.

Unless otherwise noted, all parts and percentages are by weight in the examples.

EXAMPLE 1

80 gms. of commercially available polyethylene in flake form having a density (unannealed) of 0.94 gm./cc. and a melt index of 0.00 were charged to a forced draft Fisher Isotemp oven and heated in the presence of air therein at 128–130° C. for 12 hours. 39 gms. of the thus oxidized polymer were charged to a Brabender Plastograph along with 0.2 gm. of 4,4′-thiobis(6-t-butyl-metacresol), an antioxidant, sold under the trade name "Santonox" by Monsanto Chemical Company. After a 10 minute milling period at 157–165° C. a 4.0 gm. sample was removed and on analysis had a carbonyl content of 0.61% by weight, a density of 0.96 g./cc. and a melt index of 1.9. Immediately after removing the 4.0 gm. sample, 0.72 gm. (2% by weight) of hexamethylene diamine (i.e. $H_2N-(CH_2)_6-NH_2$) was added to the Brabender charge and milling was continued an additional 10 minutes. From the time the hexamethylenediamine was added until the run was discontinued the torque increased 3330 meter-gms. On characterization the crosslinked polyethylene product had a carbonyl content of 0.29% by weight, a gel content of 39% by weight, a resistance to environmental stress cracking for 776–792 hours, a crystalline melting point as measured on a polarizing microscope in the range 131–134° C. and a percent crystallinity as measured by X-ray of 74%.

A control run on the same oxidized polyethylene using the same procedure as above excepting that no hexamethylenediamine was added resulted in an oxidized polyethylene product having a carbonyl content of 0.72% by weight, a crystalline melting point of 138–144° C., a percent crystallinity of 82% and failed on bending (resistance of 0.0 hour) for the environmental stress cracking test.

To show the necessity of having carbonyl groups present in the polymer in order to crosslink by the instant invention, the following run was carried out.

EXAMPLE 2

35 gms. of unoxidized commercially available polyethylene having a carbonyl content of 0.0%, a melt index of 1.8, an ESC resistance of 6.5 hours and a density of 0.96 g./cc. was charged along with 0.19 gm. of 4,4′-thiobis(6-t-butylmetacresol), an antioxidant, to a Brabender Plastograph and milled therein for 10 minutes at 150 to 160° C. 0.72 gm. (2% by weight) of hexamethylenediamine was added to the Brabender charge and milling was continued an additional 20 minutes. The thus milled polyethylene product on characterization had a melt index of 2.3, a gel content of 0.0% by weight and a resistance to environmental stress cracking of 0.0 hour.

EXAMPLE 3

One pound of commercially available polyethylene in flake form having a density (unannealed) of 0.94 g./cc., a melt index of 0.00 and a reduced viscosity of 9.0 was charged to a forced draft Fisher Isotemp oven and heated therein at 128–130° C. for 12 hours. The thus oxidized polymer (0.70 weight percent carbonyl) was blended on a V-blender for use in subsequent crosslinking examples.

The following examples show the effect of varying the concentration of the polyamine compound.

EXAMPLE 4

39 gm. charges of oxidized polyethylene from Example 3 were milled in a Brabender Plastograph along with 0.2 g. of 4,4′-thiobis(6-t-butylmetacresol) for 10 minutes at a temperature of 150–177° C. Varying amounts of hexamethylenediamine were thereafter added to the polymer charges and milling continued for 10–15 minutes. A control run using the oxidized polyethylene of Example 3 without adding any hexamethylene diamine was performed under the same conditions. The results after characterization of the products are shown in Table I.

Table I

| | Oxidized Polyethylene Control | Hexamethylenediamine 0.09 gms. | Hexamethylenediamine 0.20 gms. | Hexamethylenediamine 0.37 gms. |
|---|---|---|---|---|
| Example No. | 4a | 4b | 4c | 4d |
| Melt Index | 5.5 | 0.00 | 0.00 | 0.00 |
| Increase in Torque (meter-gms.) | | 1,230 | 1,780 | 2,710 |
| Weight Percent Carbonyl | 0.8 | 0.7 | 0.5 | 0.3 |
| Reduced Viscosity (deciliters/g.) | 0.9 | insoluble | insoluble | insoluble |
| Weight Percent Gel | 0 | 19.0 | 19.0 | 28.0 |
| Density (gms./cc.) | 0.966 | 0.959 | 0.957 | 0.955 |
| Environmental Stress Cracking Resistance (hrs.) | 0 | 8–21 | 294–309 | >900 |
| Percent Crystallinity (X-ray) | 80.0 | 79.0 | 85.0 | 80.0 |
| Modulus (p.s.i.) | 199,260 | 186,270 | 165,960 | 169,650 |
| Stress at Yield Point (p.s.i.) | 4,105 | 3,825 | 3,620 | 3,590 |
| Elongation at Yield Point (Percent) | 7.8 | 9.7 | 9.5 | 9.0 |
| Tensile Stress (p.s.i.) | 4,100 | 3,020 | 2,750 | 2,740 |
| Elongation at Failure (Percent) | 9.8 | 49.5 | 183 | 116 |

EXAMPLE 5

34 gms. of oxidized polyethylene (weight percent carbonyl=0.8) having a melt index of 5.5 and a reduced viscosity of 0.95 were milled in a Brabender Plastograph along with 0.18 gm. 4,4'-thiobis(6-t-butylmetacresol) for 10 minutes at a temperature in the range 150–170° C. 0.0017 mole of tetraethylene-pentamine, i.e.

$$H_2N(CH_2CH_2NH)_3CH_2CH_2NH_2$$

was thereafter added to the molten polymer and milling continued for an additional 10 minutes. The increase in torque recorded from the time the polyamine compound was added until the reaction was discontinued was 1350 meter-grams. The crosslinked polyethylene product on characterization had a melt index of 0.00, a gel content of 39% by weight and a resistance to environmental stress cracking of 600 hours.

EXAMPLE 6

Example 5 was repeated excepting 0.0017 mole of phenylene-1,4-diamine, i.e.,

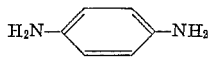

was substituted for the tetraethylenepentamine. The crosslinked polyethylene product had a melt index of 0.00 and a gel content of 21% by weight.

The density of the polyethylene employed in this invention is not critical. Thus both low density (about 0.91) and high density (0.97) and the range in between can be oxidized and crosslinked by the present invention.

EXAMPLE 7

120 gms. of commercially available polyethylene having a density of 0.91 and a melt index of 0.28 were charged to a Brabender Plastograph and milled therein at 90 r.p.m. with a polymer temperature range of 135–181° C. for 95 minutes. The thus oxidized polymer had a carbonyl content of 0.37%. 35 gms. of the thus oxidized polyethylene were charged to a Brabender Plastograph along with 0.2 gm. 4,4'-thiobis(6-t-butylmetacresol) and milled for 10 minutes at 130° C. 0.0015 mole of hexamethylenediamine were added to the molten charge and milling continued for 10 minutes. The resulting crosslinked polyethylene product had a melt index of 0.00.

The following example shows the operability of the instant invention with ethylene-containing olefinic copolymers containing carbonyl groups.

EXAMPLE 8

80 gms. of a commercially available ethylene-butylene copolymer (97.9:2.1 wt. percent respectively) having a density of 0.933, a high load melt index of 1.7 and a reduced viscosity of 4.4 were charged to a forced draft Fisher Isotemp oven and heated in the presence of air therein at 126° C. for 4 hours. The thus oxidized copolymer had a carbonyl content of 0.60 weight percent.

35 gms. of the thus oxidized copolymer were charged to a Brabender Plastograph along with 0.2 gm. of 4,4'-thiobis(6-t-butylmetacresol) as an antioxidant and milling continued for 15 minutes at 150–160° C. until a constant torque was obtained. 0.50 gm. of hexamethylenediamine was added to the molten charge and milling was continued for an additional 10 minutes. The increase in torque measured from the time the hexamethylenediamine was added was in excess of 1500 meter-grams. On characterization the crosslinked copolymer product had a gel content in excess of 15% by weight.

EXAMPLE 9

Example 8 was repeated except that 0.70 gm. of 1,8-diaminonaphthalene was substituted for the hexamethylenediamine. The crosslinked copolymer product had a gel content in excess of 6% by weight.

In the ethylene containing olefinic copolymers no limitation is placed on the relative proportions of olefinic comonomer to ethylene in the copolymer. The copolymer is oxidized by the same methods as the polyethylene to form carbonyl groups therein. However, it should be understood that crosslinking by the present invention will only occur at the situs of the carbonyl groups in the ethylene containing olefinic copolymers and polyethylene.

It has also been found that compounds which are precursers of at least bifunctional polyamine compounds containing at least two primary amino groups wherein the nitrogen in each primary amino group is attached to a hydrocarbon radical are operable in this invention. By the term "precursors" as used herein is meant any compound or combination of compounds which under the conditions of crosslinking as described herein forms in situ a polyamine compound containing at least 2 primary amino groups wherein the nitrogen in each of said amino groups is attached to a hydrocarbon radical. For example, one can cite several different types of precursors: (1) mixture of monoprimary amines which interact chemically to give diamines in situ. Ethanolamine with an equivalent amount of β-alanine, e.g., reacts through esterification to give

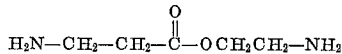

the latter compound being an operable diamine according to the definition of the present invention. Another instance would be an equimolar mixture of allyl amine and 2-mercaptoethyl amine, which, through mercapto addition to the double bond would be expected to yield $H_2N-CH_2-CH_2-S-CH_2CH_2CH_2NH_2$ and/or

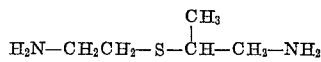

both of which are operable diamines which would serve as crosslinking agents in the present invention. (2) Compounds which, when exposed to conditions of crosslinking of the polymer, are capable of decomposing thermally or hydrolytically to give diamines in situ. Ethylenediamine carbamate

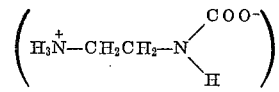

hexamethylenediamine carbamate

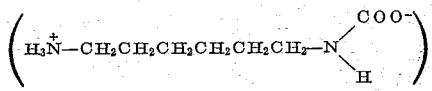

and N-acetylhexamethylenediamine

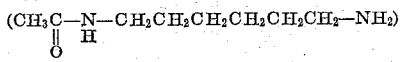

serve to exemplify but not limit these types of compounds. (3) Amine salts with organic or inorganic acids. Ethylenediamine hydrochloride, hexamethylenediamine monooleate, etc. are examples of this type.

Such precursors may in some cases be advantageous over the free-$NH_2$-containing compound. Use of a precursor may, for example, improve the processing characteristics of the polymer compound by preventing precure or "scorchiness" during the compounding and molding operations. The following examples show the operability of such precursers.

EXAMPLE 10

34 gms. of commercially available polyethylene was oxidized to a carbonyl content of 0.8 weight percent, a density of 0.94, a reduced viscosity of 1.0 and a melt index of 2.8 and charged along with 0.07 gm. of 4,4'-thiobis(6-t-butylmetacresol) to a Brabender Plastograph maintained at a temperature in the range 150–160° C. After a 15 minute milling period a uniform torque was obtained and 0.18 gm. of ethylenediamine carbamate, i.e.

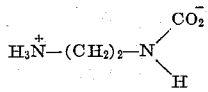

was added to the molten polymer charge. Within 4 minutes after the addition of the ethylenediamine carbamate, the torque increased 1090 meter-grams. On characterization the crosslinked polyethylene product had a gel content of 43% by weight.

EXAMPLE 11

Example 10 was repeated except that 0.28 gm. of hexamethylenediamine carbamate, i.e.

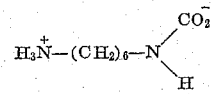

was substituted for the 0.18 gm. of ethylenediamine carbamate and the milling temperature was in the range 155–170° C. The increase in torque within the 5 minute period after the addition of the hexamethylenediamine carbamate was 1520 meter-grams.

The crosslinking step of the invention is performed at temperatures at which the polymer is sufficiently soft to be worked. Thus for low density polyethylene having a softening point in the range 90 to 110° C., crosslinking is performed at temperatures in the range 90 to 150° C. whereas for high density polyethylene having a softening point in the range 125–139° C. crosslinking is carried out at temperatures ranging from the softening point up to 200° C. Higher temperatures are operable but are unnecessary. When using hydrazine as the polyamine compound in the instant invention it is necessary due to its low boiling point to maintain either a closed or pressurized system to preclude evaporation of the hydrazine during the crosslinking step. For optimum efficiency a pressurized system maintaining the hydrazine in the liquid phase is preferred. However a closed system with the hydrazine in the gaseous phase is operable.

When carbonyl groups are introduced into the polyethylene by oxidation, it is preferred that oxidation stabilizers, i.e. antioxdants not be present. However, even if antioxidants are present the invention is operable, only requiring the oxidation step to be of longer duration in order to use up the antioxidant prior to forming carbonyl groups.

The polyethylene-polyamine compound compositions can, if desired, include other additives which do not interact directly with the carbonyl groups or the polyamine compound which are normally employed in plastic compositions. By such additives is meant the inclusion of plasticizing, lubricating, extending, filling, stabilizing, flame retarding, coloring ingredients such as dyes and pigments, and activators or accelerators for the crosslinking reaction. The proper choice of such additives would be obvious to one skilled in the art.

It has been found that the crosslinking reaction of the present invention can be accelerated by the addition of organic bases. Such organic bases can be primary amines, but ordinarily would be either secondary or tertiary amines, which, in themselves cannot react with the carbonyl groups under the conditions of the experiment. However, said secondary and tertiary amines enhance and promote the reaction of the primary amino groups with the carbonyl groups. This in turn results in an acceleration of the rate of crosslinking. In one instance, the time to achieve maximum crosslinking of oxidized polyethylene with hexamethylenediamine was reduced from 10 minutes to 5 minutes by the addition of 3 moles of di-2-ethyhexylamine/mole of hexamethylenediamine. In many cases the secondary or tertiary amino accelerator is provided by the structure of the crosslinking agent. For example, tetraethylenepentamine contains in its structure 3 moles of secondary amino groups/mole of tetramethylenepentamine. These secondary groups are non-reactive toward carbonyl groups, but cause acceleration of the primary amino group reaction such that only 3.5 minutes are required to achieve maximum crosslinking under the same conditions which require 10 minutes with hexamethylenediamine.

Various methods of admixing the polyethylene and the polyamine compound can be employed in practicing the instant invention. For example the polyamine compound can be added directly to the molten polymer. In addition the polyamine compound can be admixed with the polyethylene and thereafter heated above the softening point of the polymer. To aid uniformity of admixture at temperatures below the softening point of the polymer, e.g. room temperature, a solvent for the polyamine compound can if desired be employed. Generally polar solvents which will not interfere with the crosslinking reaction are used. Examples of operable solvents include water, benzene and alcohol.

The crosslinked polyethylene product of the instant invention has many and varied uses e.g. wire coating, film, containers, molded items, protective coatings for wood, metal, paper etc., caulking compositions, gaskets and the like.

I claim:

1. Composition useful in the production of crosslinked members of the polymeric group consisting of ethylene and ethylene-α mono olefin copolymers, said group member having a carbonyl content in the range 0.05 to 5.0% by weight and a crosslinking member of the group consisting of hydrazine, and a polyamine compound containing at least two primary amino groups wherein the nitrogen in each amino group is attached to a hydrocarbon radical, said crosslinking group member being present in an amount equal to 5% to 200% of the amount necessary to react stoichiometrically with said carbonyl in said polymeric group member.

2. The composition of claim 1 wherein the polyamine compound is hexamethylenediamine.

3. The composition of claim 1 wherein the polyamine compound is tetraethylenepentamine.

4. The composition of claim 1 wherein the polyamine compound is phenylene-1,4-diamine.

5. The composition of claim 1 wherein the polyamine compound is 1,8-diaminonaphthalene.

6. The process of crosslinking members of the polymeric group consisting of ethylene and ethylene-α mono olefin copolymers, said group member having a carbonyl content in the range 0.05 to 5% by weight, which comprises admixing said polymeric group member with a crosslinking member of the group consisting of hydrazine and a polyamine compound containing at least two primary amino groups wherein the nitrogen in each of said amino groups is attached to a hydrocarbon radical, said crosslinking group member being present in said admixture in an amount equal to 5% to 200% of the amount necessary to react stoichiometrically with said carbonyl in said polymeric group member, and heating the resultant mixture to effect crosslinking.

7. The process according to claim 6 wherein the group member is hydrazine and the heating step is carried out under sufficient pressure to maintain the hydrazine in the liquid phase.

8. The process according to claim 6 wherein the group member is hydrazine and the heating step is performed in a closed system.

9. The process according to claim 6 wherein the group member is hexamethylenediamine.

10. The process according to claim 6 wherein the group member is tetraethylenepentamine.

11. The process according to claim 6 wherein the group member is phenylene-1,4-diamine.

12. The process according to claim 6 wherein the group member is 1,8-diaminonaphthalene.

13. The process of crosslinking members of the polymeric group consisting of ethylene and ethylene-α mono olefin copolymers which comprises oxidizing said polymeric group member in air at a temperature in the range 100 to 200° C. until the polymeric group member contains 0.05 to 5.0 weight percent carbonyl, admixing said carbonyl containing polymeric group member with a crosslinking member of the group consisting of hydrazine and a polyamine compound containing at least two primary amino groups wherein the nitrogen in each amino group is attached to a hydrocarbon radical, said crosslinking group member being present in said admixture in an amount equal to 5% to 200% of the amount necessary to react stoichiometrically with said carbonyl in said polymeric group member and heating the resultant mixture to effect crosslinking.

14. The process of claim 13 wherein the polyamine compound is hexamethylenediamine.

15. The process of claim 13 wherein the polyamine compound is tetraethylenepentamine.

16. The process of claim 13 wherein the polyamine compound is phenylene-1,4-diamine.

17. The process of claim 13 wherein the polyamine compound is 1,8-diaminonaphthalene.

18. The process of crosslinking normally solid polyethylene having a carbonyl content in the range 0.05 to 5.0% by weight which comprises admixing said polyethylene with hexamethylenediamine in an amount equal to 5% to 200% necessary to react stoichiometrically with said carbonyl in said polyethylene and heating the resultant mixture to effect crosslinking.

19. The process of crosslinking members of the polymeric group consisting of ethylene and ethylene-α mono olefin copolymers, said group member having a carbonyl content in the range 0.05 to 5% by weight which comprises admixing said polymeric group member at a temperature above its softening point with a crosslinking member of the group consisting of hydrazine and a polyamine compound containing at least two primary amino groups wherein the nitrogen in each of said amino groups is attached to a hydrocarbon radical, and crosslinking group member being present in said admixture in an amount equal to 5% to 200% of the amount necessary to react stoichiometrically with said carbonyl in the polymeric group member.

20. The composition of claim 1 wherein the polymeric group member is polyethylene.

References Cited by the Examiner

FOREIGN PATENTS 613,203   1/61   Canada.

OTHER REFERENCES

Renfrew et al.: "Polythene," pp. 390–91 (Interscience, 1960).

Degering: "Outline of Organic Nitrogen Compounds," p. 214, (University Lithoprinters, 1950).

JOSEPH L. SCHOFER, *Primary Examiner.*